(12) United States Patent
Shimizu et al.

(10) Patent No.: US 8,128,239 B2
(45) Date of Patent: Mar. 6, 2012

(54) LIGHT SOURCE DEVICE AND PROJECTOR

(75) Inventors: Tetsuo Shimizu, Matsumoto (JP);
Kaname Nagatani, Matsumoto (JP);
Kunihiko Takagi, Okaya (JP); Akira Egawa, Shiojiri (JP); Yuji Takado, Matsumoto (JP); Satoshi Kinoshita, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 203 days.

(21) Appl. No.: 12/757,188

(22) Filed: Apr. 9, 2010

(65) Prior Publication Data
US 2010/0259732 A1  Oct. 14, 2010

(30) Foreign Application Priority Data

Apr. 14, 2009  (JP) ................................ 2009-097716

(51) Int. Cl.
*G03B 21/28* (2006.01)
(52) U.S. Cl. ..................................... 353/99; 362/296.01
(58) Field of Classification Search ............. 353/99; 362/296.01, 296.05
See application file for complete search history.

(56) References Cited

U.S. PATENT DOCUMENTS

| 7,201,825 B2* | 4/2007 | Dezutter et al. | 162/9 |
| 7,963,662 B2* | 6/2011 | Chung et al. | 362/223 |
| 8,004,189 B2* | 8/2011 | Hasegawa et al. | 313/512 |

FOREIGN PATENT DOCUMENTS

JP  2001-109068  4/2001

* cited by examiner

*Primary Examiner* — Seung C Sohn
(74) *Attorney, Agent, or Firm* — Maschoff Gilmore & Israelsen

(57) ABSTRACT

A light source device includes a light emitting tube having a light emitting section that emits light, a first sealing section on one side of the light emitting section formed integrally with the light emitting section, and a second sealing section on the other side of the light emitting section formed integrally with the light emitting section. A secondary reflecting mirror having a secondary reflecting surface covers part of a periphery of the light emitting section and reflects light emitted from the light emitting section. A primary reflecting mirror having a primary reflecting surface reflects the light emitted from the light emitting section and the light reflected by the secondary reflecting mirror. The secondary reflecting mirror has a first reference plane defined by a first boundary line as a boundary between the light emitting section and the first sealing section, which does not intersect with the secondary reflecting surface.

7 Claims, 5 Drawing Sheets

LIGHT SOURCE DEVICE AND PROJECTOR

BACKGROUND

1. Technical Field

The present invention relates to a light source device and a projector, in particular to a technology of a light source device having a light emitting section partially covered by a secondary reflecting mirror.

2. Related Art

In the lamp used as a light source of a projector, specifically a discharge lamp such as a super-high pressure mercury lamp, there is used a reflector (a reflecting mirror) for reflecting light emitted from a light emitting tube. In the past, in order for obtaining bright images efficiently by a projector, there has been proposed a configuration of a light source device for improving efficiency of light emitted from a light emitting tube. For example, there has been proposed a technology of providing a secondary reflecting mirror covering a part of a light emitting tube separately from the reflector as a primary reflecting mirror (see e.g., Japanese Patent No. 3350003). The light reflected by the secondary reflecting mirror is input the primary reflecting mirror after passing through the light emitting tube, and then reflected frontward by the primary reflecting mirror. Thus, it becomes possible to make the light emitted from the light emitting tube efficiently proceed toward an optical system for using the light from the light source device, and at the same time, to achieve low-profiling of the light source device.

Since lamps used in projectors becomes in a high-temperature state on the ground that most of the electrical energy supplied thereto is turned into heat, it is often performed that air or the like is sprayed on light emitting tubes, thereby cooling the light emitting tubes. However, in the case of the configuration provided with the secondary reflecting mirror, in most cases there is insufficient space between the light emitting tube and the secondary reflecting mirror, insufficient air can only be sprayed to the portion covered by the secondary reflecting mirror, thus cooling might be insufficient.

In some cases, projectors are arranged to allow the user to use the projectors selectively in the upright state and in the inverted state, for example. If the use state of the projector is changed, the posture of the light source device is also changed, and the positional relationship between the light emitting tube and the secondary reflecting mirror is also changed in association therewith. In particular in the case in which the upper portion of the light emitting tube is covered by the secondary reflecting mirror, the heat becomes apt to be trapped between the light emitting tube and the secondary reflecting mirror, and accordingly, cooling is apt to be insufficient. In the portion of the light emitting tube, on which insufficient cooling is executed, there can arise the case in which a transparent member constituting the light emitting tube is crystallized with the heat to thereby become clouded.

SUMMARY

An advantage of some aspects of the invention is to provide a light source device capable of spraying sufficient air on the portion of the light emitting tube, covered by the secondary reflecting mirror, thereby preventing occurrence of a failure caused by insufficient cooling of the light emitting tube, and a projector including the light source device.

According to an aspect of the invention, there is provided a light source device including a light emitting tube having a light emitting section adapted to emit light, a first sealing section disposed on one side of the light emitting section integrally with the light emitting section, and a second sealing section disposed on the other side of the light emitting section integrally with the light emitting section, a secondary reflecting mirror having a secondary reflecting surface covering a part of a periphery of the light emitting section, and adapted to reflect light emitted from the light emitting section, and a primary reflecting mirror having a primary reflecting surface adapted to reflect the light emitted from the light emitting section and the light reflected by the secondary reflecting mirror, and the secondary reflecting mirror has a shape with which a first reference plane determined based on a first boundary line as a boundary between the light emitting section and the first sealing section and the secondary reflecting surface fail to intersect with each other.

Since the secondary reflecting mirror is formed to have a shape with which the first reference plane and the secondary reflecting surface do not intersect with each other, the gap between the edge of the secondary reflecting surface on the side of the first sealing section and the first sealing section can be increased compared to the case of forming the secondary reflecting surface to have a shape with which the first reference plane and the secondary reflecting surface intersect with each other. Thus, it becomes possible to spray sufficient air on the portion of the light emitting tube, covered by the secondary reflecting mirror, and at the same time, it becomes easy for the air sprayed toward the light emitting section to enter the gap between the light emitting section and the secondary reflecting surface, thus the cooling efficiency of the light emitting tube can be improved.

Further, in a preferred aspect of the invention, it is preferable that the first reference plane is a circular conical plane including a center point of the light emitting section and the first boundary line. Since the first reference plane is set to be the circular conical plane configured including the center point of the light emitting section and the first boundary line, it becomes possible to increase the gap between the edge of the secondary reflecting surface on the side of the first sealing section and the first sealing section, thereby improving the cooling efficiency of the light emitting tube.

Further, in a preferred aspect of the invention, it is preferable that the secondary reflecting mirror has a shape with which a second reference plane determined based on a second boundary line as a boundary between the light emitting section and the second sealing section and the secondary reflecting surface fail to intersect with each other. Since the secondary reflecting mirror is formed to have a shape with which the second reference plane and the secondary reflecting surface do not intersect with each other, the gap between the edge of the secondary reflecting surface on the side of the second sealing section and the second sealing section can be increased compared to the case of forming the secondary reflecting mirror to have a shape with which the second reference plane and the secondary reflecting surface intersect with each other. If the gap increases, for example, it becomes easier for the air sprayed from the side of the first sealing section and passing through the gap between the light emitting section and the secondary reflecting surface to get out to the outside of the secondary reflecting mirror. Thus, it becomes possible to smooth the flow of the air between the light emitting section and the secondary reflecting surface, thereby improving the cooling efficiency of the light emitting tube.

Further, in a preferred aspect of the invention, it is preferable that the second reference plane is a circular conical plane including the center point of the light emitting section and the second boundary line. Since the second reference plane is set to be the circular conical plane configured including the center point of the light emitting section and the second boundary line, it becomes possible to increase the gap between the edge of the secondary reflecting surface on the side of the second sealing section and the second sealing section, thereby improving the cooling efficiency of the light emitting tube.

Further, in a preferred aspect of the invention, it is preferable that there is further provided an extending section disposed integrally with the secondary reflecting mirror adapted to cover a part of the second sealing section, and an opening is provided to at least one of the other side of the secondary reflecting mirror and the extending section. In order for performing the positioning and fixing of the secondary reflecting mirror in the light source device, the extending section might be formed on the other side of the secondary reflecting mirror. Even in such a case, it is possible to make it easier for the air having passed through the gap between the light emitting section and the secondary reflecting surface to get out to the outside of the secondary reflecting mirror by providing the opening to at least one of the other side of the secondary reflecting mirror and the extending section. Thus, it becomes possible to smooth the flow of the air between the light emitting section and the secondary reflecting surface, thereby improving the cooling efficiency of the light emitting tube.

Further, in a preferred aspect of the invention, it is preferable that an angle formed between a line connecting an edge of the secondary reflecting surface on at least one of a side on which the first sealing section is disposed and a side on which the second sealing section is disposed, and a center point of the light emitting section, and a center axis of the light emitting tube is smaller than 45°. If the gap between the edge of the secondary reflecting surface and the second sealing section is enlarged too much in order for improving the cooling efficiency, the amount of light reflected by the secondary reflecting surface is reduced, which decreases the amount of light proceeding toward the illuminated surface, thus the efficiency of the light might be degraded. In contrast, by setting the angle formed between the line connecting the edge of the secondary reflecting surface and the center point of the light emitting section and the center axis of the light emitting tube to be smaller than 45°, it becomes possible to prevent the amount of light reflected by the secondary reflecting surface from decreasing, thus preventing the degradation in the efficiency of the light.

According to another aspect of the invention, there is provided a projector including either one of the light source devices described above, and a spatial light modulation device adapted to modulate the light emitted from the light source device in accordance with an image signal. By using the light source device described above, it becomes possible to obtain a projector capable of preventing the failure of the light source device caused by defective cooling, and displaying bright images stably and with efficiency.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, some embodiments of the invention will be described in detail with reference to the accompanying drawings.

First Embodiment

Figure 1:
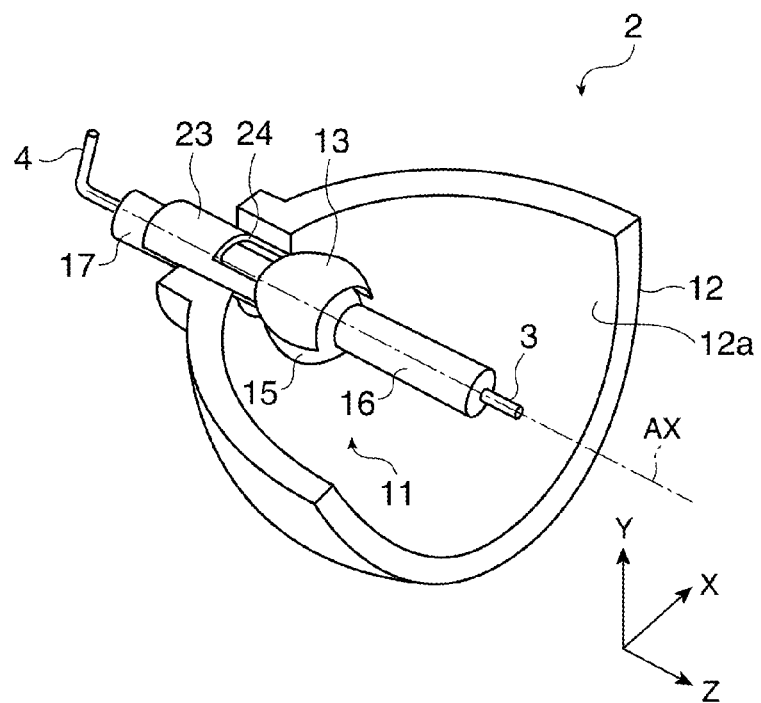
FIG. 1 is an appearance perspective view showing a schematic configuration of a light source device according to a first embodiment of the invention.

FIG. 1 is an appearance perspective view showing a schematic configuration of a light source device 2 according to a first embodiment of the invention. The light emitting tube 11 is, for example, a super-high pressure mercury lamp. The light emitting tube 11 is provided with a light emitting section 15 having a substantially spherical shape. Inside the light emitting section 15, arc is formed between electrodes 3, 4 described later, thereby emitting light from the light emitting section 15. The light emitting section 15 is provided with a first sealing section 16 and a second sealing section 17 so as to form an integrated member. The first sealing section 16 has a cylindrical shape, and is disposed on one side (the front side) of the light emitting section 15. The second sealing section 17 has a cylindrical shape, and is disposed on the other side (the rear side) of the light emitting section 15. According to the configuration described above, the light emitting tube 11 has a shape of sandwiching the light emitting section 15 with the first sealing section 16 and the second sealing section 17.

It should be noted that in the explanation of the embodiments of the invention, an X axis is an axis perpendicular to the center axis AX of the light emitting tube 11. A Y axis is an axis perpendicular to the center axis AX and the X axis. A Z axis is an axis parallel to the center axis AX. The direction of the arrow of the Z axis represents a direction from the light source device 2 toward an illuminated surface not shown. It is assumed that the direction of the arrow of each axis is a positive direction, and a direction opposite thereto is a negative direction. The positive direction side (the side on which the illuminated surface is located) along the Z axis with respect to the light source device 2 is referred to as a front side, and the negative direction side is referred to as a rear side.

Figure 2:
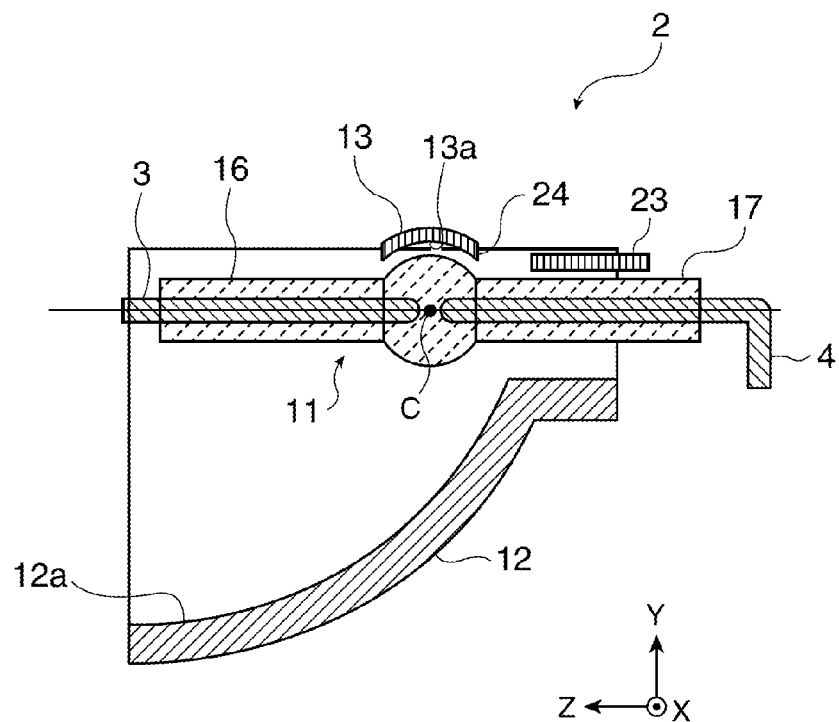
FIG. 2 is a cross-sectional view of the light source device 2 cut along a Y-Z plane.

FIG. 2 is a cross-sectional view of the light source device 2 cut along a Y-Z plane. The light emitting tube 11 is provided with the electrodes 3, 4 along the center axis AX. The electrode 3 penetrates a substantial center of the first sealing section 16, and the electrode 4 penetrates a substantial center of the second sealing section 17. Ends of the respective electrodes 3, 4 are opposed to each other across the center point C of the light emitting section 15, and a predetermined gap is provided between the ends. When a voltage is applied to the electrodes 3, 4, the arc is formed between the electrodes 3, 4, thereby emitting light from the light emitting section 15.

The primary reflecting mirror 12 is provided with a primary reflecting surface 12a formed on the side where the light emitting tube 11 is disposed. The primary reflecting mirror 12 is provided with the primary reflecting surface 12a, thereby reflecting the light emitted from light emitting tube 11 and the light reflected by the secondary reflecting mirror 13 described later, and making them proceed forward. The primary reflecting surface 12a has a shape substantially the same as a curved surface obtained by cutting a spheroidal surface, which is obtained by rotating an ellipse around the center axis AX, with a predetermined plane. Further, the light emitting tube 11 is disposed so that a primary focal point of the ellipse defining the primary reflecting surface 12a and the center point C of the light emitting section 15 are substantially identical to each other. In the present embodiment, the predetermined plane corresponds to a plane including the center axis AX. It should be noted that the predetermined plane can be set to be a plane other than the plane including the center axis AX in order for improving the efficiency of the light. The predetermined plane can be, for example, a plane parallel to the center axis AX or a plane having an angle with the center axis AX.

The primary reflecting mirror 12 is formed by evaporating a highly reflective material such as a dielectric multilayer film or a metal material on a surface of a substrate formed to have a desired shape. As the highly reflective material, a material having high reflectance with respect to the light with a wavelength in a visible range. By using the primary reflecting mirror 12 provided with the primary reflecting surface 12a having the shape obtained by cutting a spheroidal surface, it is possible to make the light source device more low-profile than a light source device using a reflecting mirror provided with a reflecting surface other than the reflecting surface obtained by cutting a spheroidal surface. It should be noted that the shape of the primary reflecting mirror 12 is not limited to a shape substantially identical to the curved surface obtained by cutting a spheroidal surface. For example, it is also possible to have a shape substantially identical to a curved surface obtained by cutting a curve of revolution, which is obtained by rotating a predetermined curve such as a parabola.

Figure 3:
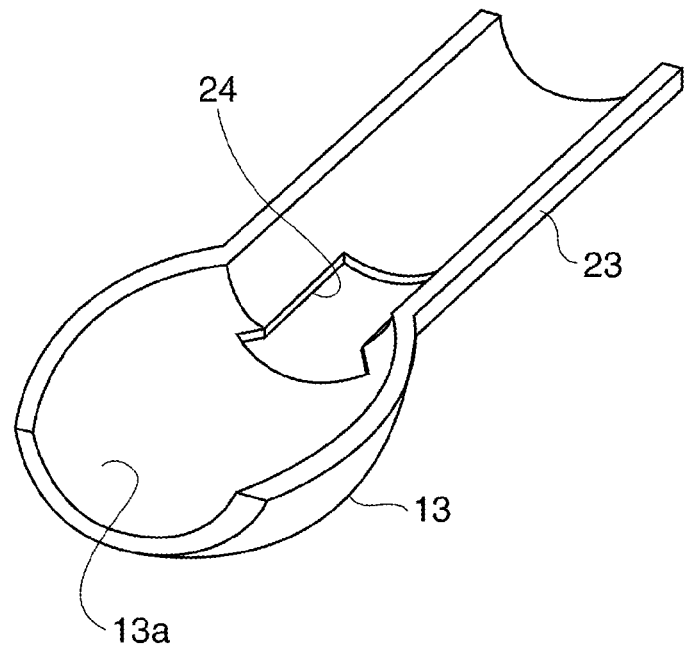
FIG. 3 is an appearance perspective view of a secondary reflecting mirror.

FIG. 3 is an appearance perspective view of the secondary reflecting mirror 13. The secondary reflecting mirror 13 covers a part of the periphery of the light emitting section 15 from above. There is provided a gap between the secondary reflecting mirror 13 and the light emitting section 15. The secondary reflecting mirror 13 is provided with a secondary reflecting surface 13a formed on the side where the light emitting tube 11 is disposed. The secondary reflecting mirror 13 is provided with the secondary reflecting surface 13a, thereby reflecting the light, which is emitted from the light emitting tube 11, toward the light emitting section 15. The light reflected toward the light emitting section 15 passes through the light emitting section 15, and is then input to the primary reflecting surface 12a of the primary reflecting mirror 12. The secondary reflecting surface 13a is formed to have a spherical shape or a polynomial aspherical shape.

The secondary reflecting mirror 13 is formed by evaporating a highly reflective material such as a dielectric multilayer film or a metal material on a surface of a substrate formed to have a desired shape. As the highly reflective material, a material having high reflectance with respect to the light with a wavelength in a visible range.

Figure 4:
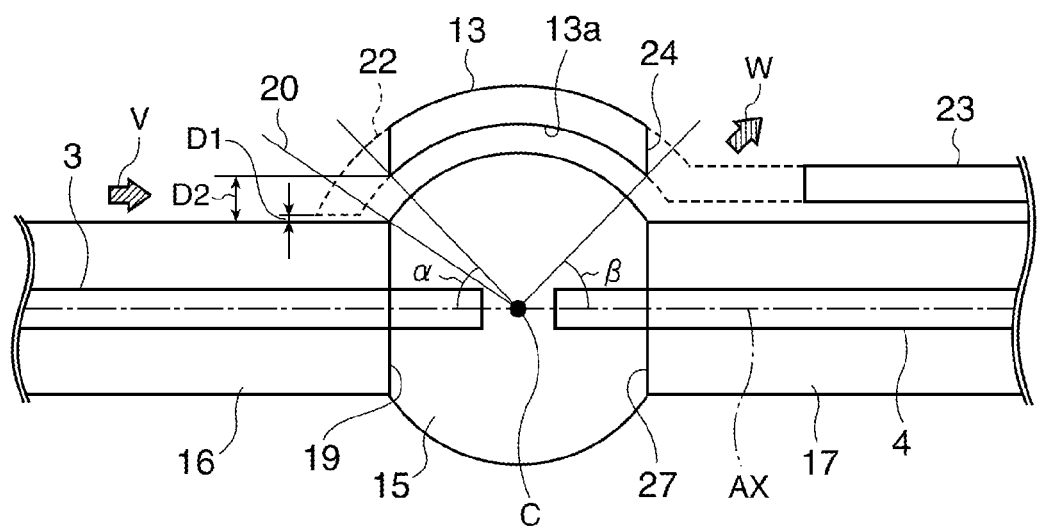
FIG. 4 is a partial enlarged cross-sectional view enlargedly showing the periphery of a light emitting section.
Figure 5:
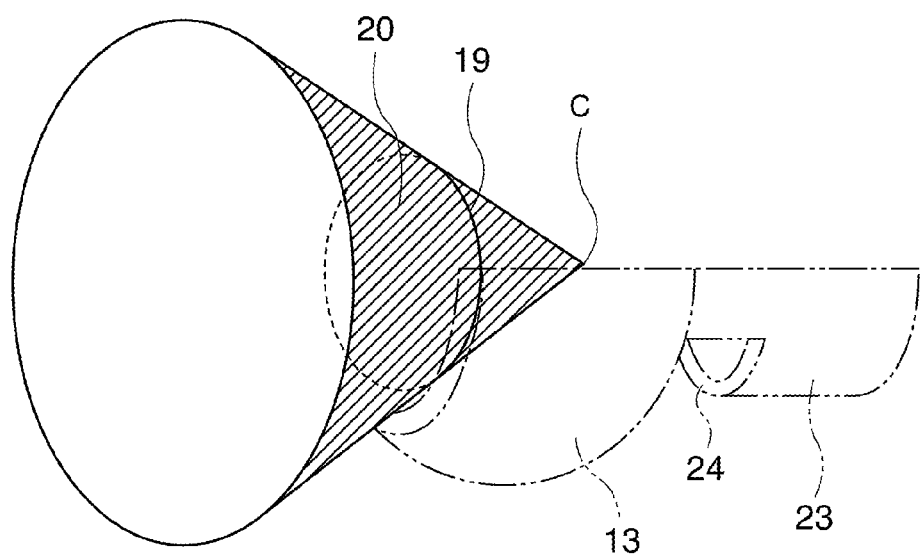
FIG. 5 is a conceptual diagram showing a relationship between a circular conical plane and the secondary reflecting mirror.

FIG. 4 is a partially enlarged cross-sectional view enlargedly showing the periphery of the light emitting section 15 out of the cross-sectional view of the light source device 2 shown in FIG. 2. Here, there is defined a circular conical plane (a first reference plane) 20 formed including a front side boundary line (a first boundary line) 19 as a boundary line between the light emitting section 15 and the first sealing section 16, and the center point C of the light emitting section 15. The secondary reflecting mirror 13 is formed to have a shape with which the secondary reflecting surface 13a fails to intersect with the circular conical plane 20. For example, in the case in which the secondary reflecting mirror 13 is formed in the manufacturing process thereof to have a shape including a front side initial area 22 indicated by the broken lines, processing of cutting the front side initial area 22 is performed, thereby forming the shape with which the secondary reflecting surface 13a and the circular conical plane 20 do not intersect with each other. It should be noted that FIG. 5 is a conceptual diagram showing a relationship between the circular conical plane 20 and the secondary reflecting mirror 13.

Thus, a gap between a front edge of the secondary reflecting surface 13a and the first sealing section 16 is increased. Specifically, a gap D2 between the front edge of the secondary reflecting mirror 13, which is cut, and the first sealing section 16 becomes larger than a gap D1 between the front edge of the secondary reflecting mirror 13, which is not cut, and the first sealing section 16, resulting in D1<D2. By increasing the gap D2, it becomes easier for the air sprayed along the arrow V for cooling the light emitting section 15 to enter the gap between the secondary reflecting mirror 13 and the light emitting section 15. Since it becomes easier for the air to enter the gap between the secondary reflecting mirror 13 and the light emitting section 15, it becomes possible to spray sufficient air to the portion of the light emitting tube 11, covered by the secondary reflecting mirror 13, thus the failure caused by defective cooling of the light emitting tube 11 can be prevented from occurring.

An angle α formed between a line connecting the center point C of the light emitting section 15 and the front edge and the center axis AX is arranged to be smaller than 45 degrees. Although it is possible to improve the cooling efficiency of the light emitting section 15 by increasing the gap D2, if an amount of the cut-off of the secondary reflecting mirror 13 is increased on that purpose, the area of the secondary reflecting surface 13a decreases. If the area of the secondary reflecting surface 13a decreases, an amount of the light emitted from the light emitting section 15 toward the secondary reflecting mirror 13 and failing to enter the secondary reflecting surface 13a increases, and an amount of light proceeding toward the illuminated surface is decreased, thus degrading the efficiency of the light. In the present embodiment, the angle α formed between the line connecting the center point C of the light emitting section 15 and the front edge and the center axis AX is set to be smaller than 45 degrees, thereby preventing the degradation of the efficiency of the light.

Figure 6:
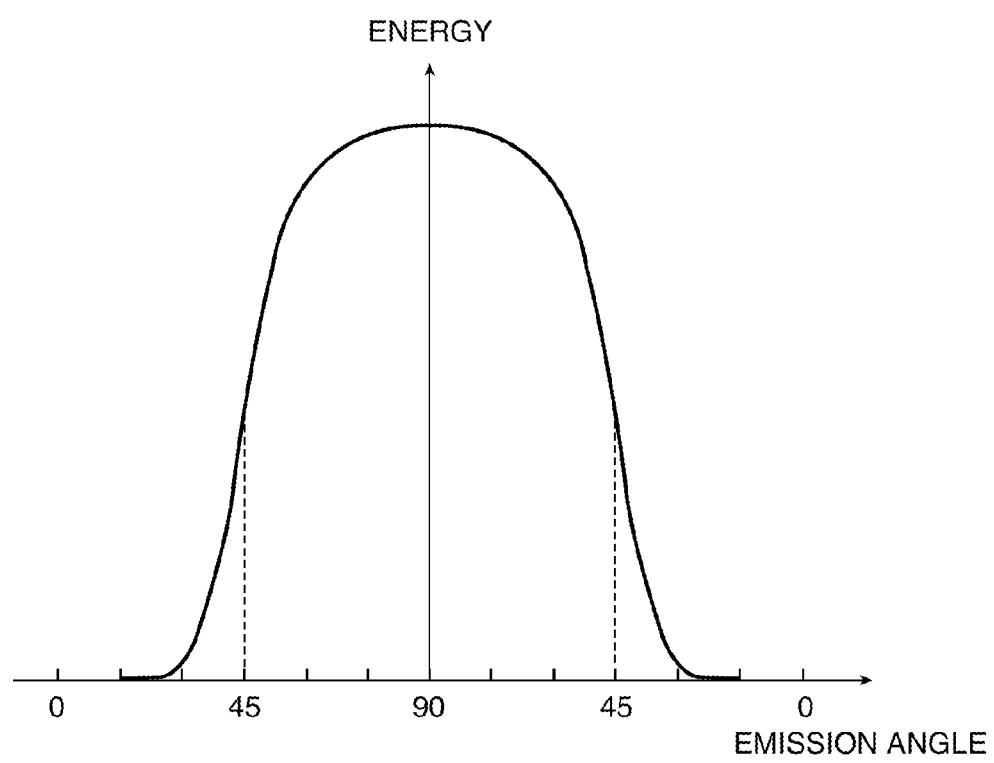
FIG. 6 is a light energy/emission characteristic chart of a light emitting tube.

FIG. 6 is a light energy/emission characteristic chart of the light emitting tube 11. The light energy/emission characteristic chart shows a general relationship between an emission angle of light and energy of the emitted light. The horizontal axis represents the emission angle of the light, namely an angle formed between a beam of light emitted from the center point C and the center axis AX. The vertical axis represents an amount of energy of the light.

As shown in FIG. 6, the light emitting tube 11 fails to emit light with constant energy in the entire emission angle, and emits light with energy a half as large as a peak amount at the emission angle of approximately 45 degrees. Therefore, if the angle α shown in FIG. 4 exceeds 45 degrees, a part of the light emitted with the energy equal to or larger than a half of the peak amount fails to enter the secondary reflecting surface 13a, thus the efficiency of the light is degraded significantly. In contrast, according to the present embodiment, since the angle α is set to be smaller than 45 degrees, it becomes possible to reflect the light emitted with the energy equal to or larger than at least a half of the peak amount by the secondary reflecting surface 13a, thereby preventing the degradation in the efficiency of the light.

As described above, by making the secondary reflecting mirror 13 have the shape of failing to intersect with the circular conical plane 20, and at the same time have the shape with which the angle α becomes smaller than 45 degrees, both of improvement in the cooling efficiency and prevention of the degradation in the efficiency of the light can be achieved.

On the rear side of the secondary reflecting mirror 13, an extending section 23 for covering a part of the second sealing section 17 is formed integrally therewith. Although detailed explanation thereof is omitted here, by fixing the extending section 23 to the second sealing section 17 or the primary reflecting mirror 12, positioning and fixing of the secondary reflecting mirror 13 in the light source device 2 are completed.

An opening 24 is formed so as to straddle the boundary between the secondary reflecting mirror 13 and the extending section 23. By forming the opening 24, it becomes easy for the air sprayed on the light emitting section 15, and passing through the gap between the light emitting section 15 and the secondary reflecting surface 13a to get out to the outside of the secondary reflecting mirror 13 passing through the opening 24 as indicated by the arrow W. Thus, it becomes possible to smooth the flow of the air between the light emitting section 15 and the secondary reflecting surface 13a, thereby improving the cooling efficiency of the light emitting tube 11.

Further, an angle β formed between a line connecting the center point C of the light emitting section 15 and the rear edge of the secondary reflecting surface 13a and the center axis AX is arranged to be smaller than 45 degrees. Although it become possible to enhance passage of the air to thereby improve the cooling efficiency of the light emitting section 15 by enlarging the opening 24, the area of the secondary reflecting surface 13a decreases. If the area of the secondary reflecting surface 13a decreases, an amount of the light emitted from the light emitting section 15 toward the secondary reflecting mirror 13 and failing to enter the secondary reflecting surface 13a increases, and an amount of light proceeding toward the illuminated surface is decreased, thus degrading the efficiency of the light. In the present embodiment, since the angle β is set to be smaller than 45 degrees, the degradation in the efficiency of the light can be prevented on the same ground as in the case of making the angle α described above smaller than 45 degrees.

It should be noted that although in the present embodiment the circular conical plane 20 configured including the front side boundary line 19 and the center point C of the light emitting section 15 is defined as the reference plane for determining the shape of the secondary reflecting mirror 13, the invention is not limited thereto. For example, a plane configured including the front side boundary line 19 can also be defined as the reference plane. In this case, the secondary reflecting mirror 13 is formed to have a shape with which the front edge of the secondary reflecting surface 13a does not project frontward beyond the line obtained by extending the front side boundary line 19 vertically upward in the cross-sectional view shown in FIG. 4. As described above, it is also possible to appropriately change the reference plane based on the positional relationship between the light emitting tube 11 and the secondary reflecting mirror 13 and so on.

Figure 7:
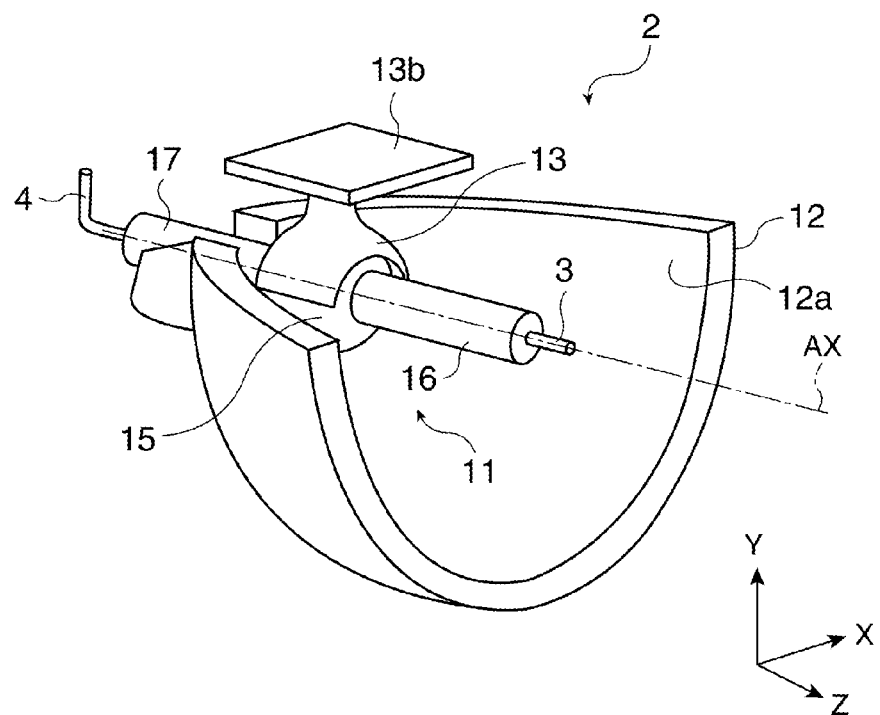
FIG. 7 is an appearance perspective view showing a schematic configuration of a light source device according to a modified example of the first embodiment.
Figure 8:
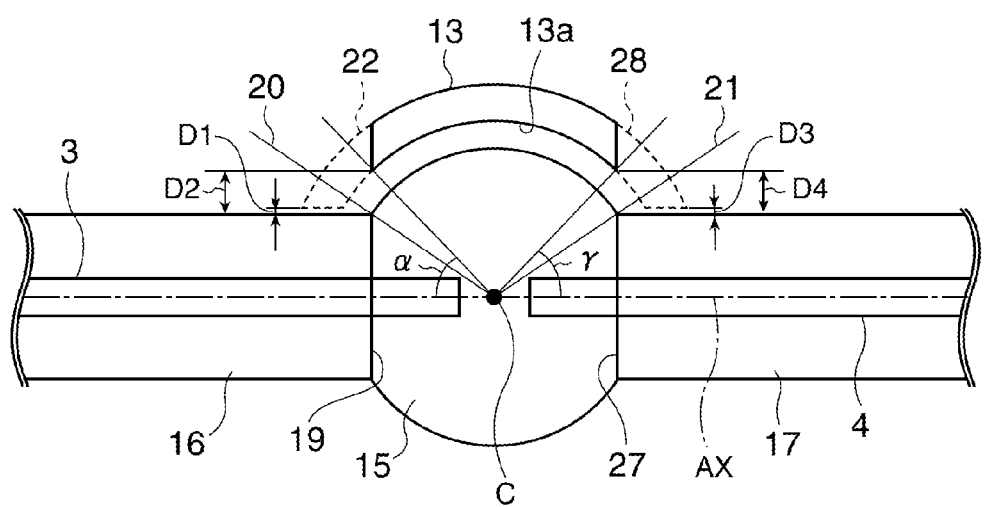
FIG. 8 is a partial enlarged cross-sectional view of the light emitting tube and the secondary reflecting mirror provided to the light source device according to the modified example.

FIG. 7 is an appearance perspective view showing a schematic configuration of the light source device 2 according to a modified example of the present embodiment. FIG. 8 is a partial enlarged cross-sectional view of the light emitting tube 11 and the secondary reflecting mirror 13 provided to the light source device 2 according to the present modified example. In the present modified example, the secondary reflecting mirror 13 is not provided with the extending section. Further, on the surface opposite to the surface on which the secondary reflecting surface 13a of the secondary reflecting mirror 13 is formed, there is formed a fixing section 13b. The fixing section 13b is fixed to, for example, an explosion-proof cover covering the opening section of the primary reflecting mirror 12. Therefore, even in the case in which the secondary reflecting mirror 13 is not provided with the extending section, it is possible to perform positioning and fixing of the secondary reflecting mirror 13 in the light source device 2 via the fixing section 13b.

Here, there is defined a circular conical plane (a second reference plane) 21 formed including a rear side boundary line (a second boundary line) 27 as a boundary line between the light emitting section 15 and the second sealing section 17, and the center point C of the light emitting section 15. The secondary reflecting mirror 13 of the present modified example is formed to have a shape with which the secondary reflecting surface 13a fails to intersect with the circular conical plane 21. For example, in the case in which the secondary reflecting mirror 13 is formed in the manufacturing process thereof to have a shape including a rear side initial area 28 indicated by the broken lines, processing of cutting the rear side initial area 28 is performed, thereby forming the shape with which the secondary reflecting surface 13a and the circular conical plane 21 do not intersect with each other. In other words, in the present modified example, there is performed processing for preventing the circular conical plane 20 and the secondary reflecting surface 13a from intersecting with each other on the front side of the secondary reflecting mirror 13, and there is performed processing for preventing the circular conical plane 21 and the secondary reflecting surface 13a from intersecting with each other on the rear side thereof.

Thus, the gap between the rear edge of the secondary reflecting surface 13a and the second sealing section 17 can be enlarged also on the rear side of the secondary reflecting mirror 13. Specifically, a gap D4 between the rear edge of the secondary reflecting mirror 13, which is cut, and the second sealing section 17 becomes larger than a gap D3 between the rear edge of the secondary reflecting mirror 13, which is not cut, and the second sealing section 17, resulting in D3<D4. Since the gap D4 is enlarged, it becomes easy for the air sprayed on the light emitting section 15 and then passing through the gap between the light emitting section 15 and the secondary reflecting surface 13a to get out to the outside of the secondary reflecting mirror 13. Thus, it becomes possible to smooth the flow of the air between the light emitting section 15 and the secondary reflecting surface 13a, thereby improving the cooling efficiency of the light emitting tube 11.

Further, an angle γ formed between a line connecting the center point C of the light emitting section 15 and the rear edge of the secondary reflecting surface 13a and the center axis AX is arranged to be smaller than 45 degrees. Although it is possible to improve the cooling efficiency of the light emitting section 15 by increasing the gap D4, if an amount of the cut-off of the secondary reflecting mirror 13 is increased on that purpose, the area of the secondary reflecting surface 13a decreases. If the area of the secondary reflecting surface 13a decreases, an amount of the light emitted from the light emitting section 15 toward the secondary reflecting mirror 13 and failing to enter the secondary reflecting surface 13a increases, and an amount of light proceeding toward the illuminated surface is decreased, thus degrading the efficiency of the light. In the present modified example, since the angle γ is set to be smaller than 45 degrees, the degradation in the efficiency of the light can be prevented on the same ground as in the case of making the angles α, β described above smaller than 45 degrees.

Second Embodiment

Figure 9:
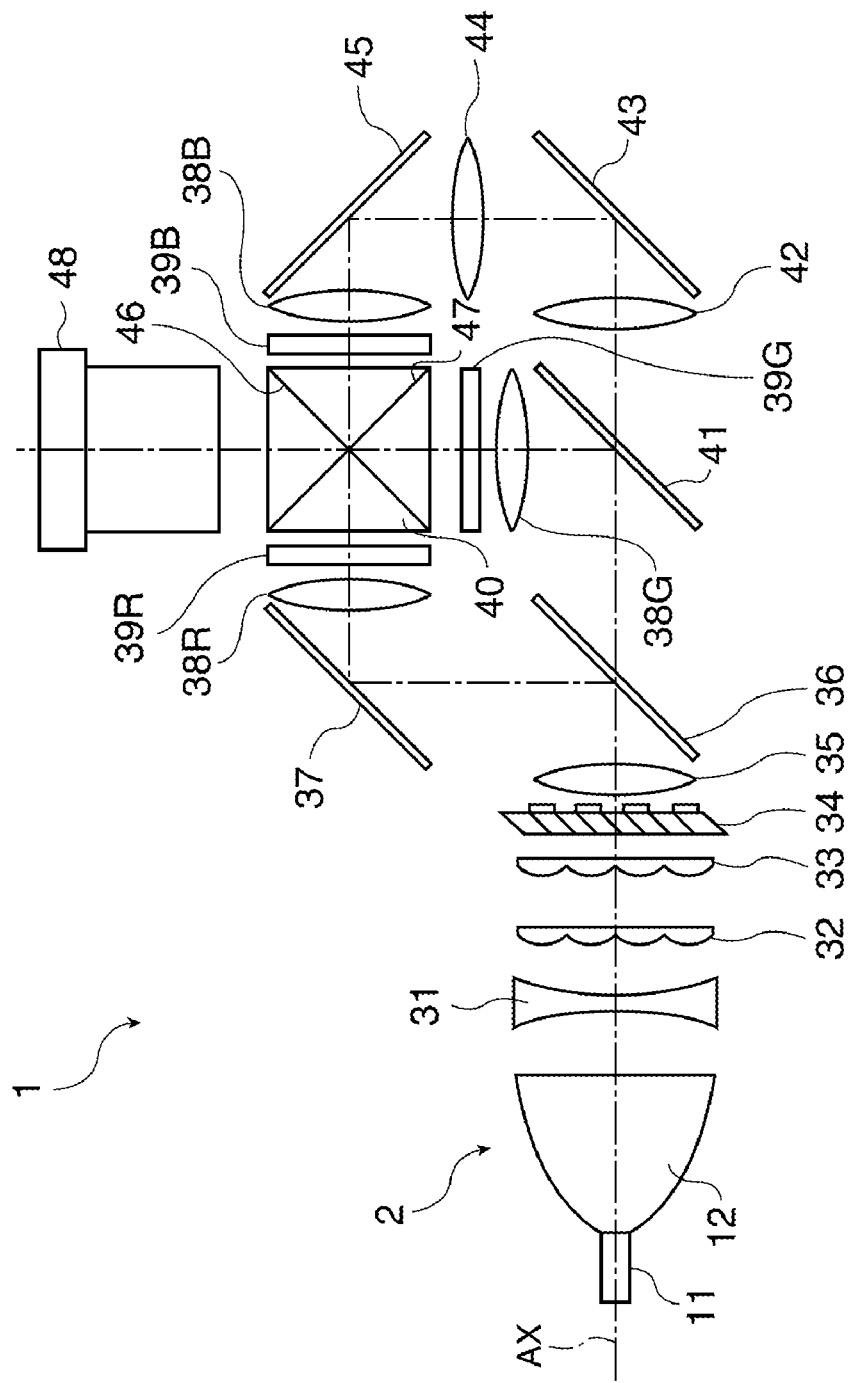
FIG. 9 is a diagram showing a schematic configuration of a projector according to a second embodiment of the invention.

FIG. 9 shows a schematic configuration of a projector 1 according to a second embodiment of the invention. The projector 1 is a front projection projector, which projects light on a screen not shown for allowing the viewer to appreciate an image by viewing the light reflected on the screen. The projector 1 has the light source device 2 according to the first embodiment described above. The light source device 2 emits the light including red (R) light, green (G) light, and blue (B) light. A concave lens 31 collimates the light emitted from the light source device 2.

A first integrator lens 32 and a second integrator lens 33 each have a plurality of lens elements arranged in an array. The first integrator lens 32 divides the light beam from the concave lens 31 into a plurality of light beams. Each of the lens elements of the first integrator lens 32 focuses the light beam from the concave lens 31 in the vicinity of the corresponding one of the lens elements of the second integrator lens 33. The lens elements of the second integrator lens 33 each form the image of the corresponding one of the lens elements of the first integrator lens 32 on a spatial light modulation device.

The light having passed through the two integrator lenses 32, 33 is converted by a polarization conversion element 34 into linearly polarized light having a specific vibration direction. An overlapping lens 35 overlaps the images of the respective lens elements of the first integrator lens 32 on the spatial light modulation device. The first integrator lens 32, the second integrator lens 33, and the overlapping lens 35 equalize the intensity distribution of the light from the light source device 2 on the spatial light modulation device. The light from the overlapping lens 35 enters a first dichroic mirror 36. The first dichroic mirror 36 reflects the R light and transmits the G light and the B light. The R light input to the first dichroic mirror 36 is reflected by the first dichroic mirror 36 and a reflecting mirror 37 to thereby be folded in the light path, and then input to an R-light field lens 38R. The R-light field lens 38R collimates the R light from the reflecting mirror 37, and then input it in an R-light spatial light modulation device 39R.

The R-light spatial light modulation device 39R is a spatial light modulation device for modulating the R light in accordance with an image signal, and is a transmissive liquid crystal display device. A liquid crystal panel not shown provided to the R-light spatial light modulation device 39R has a liquid crystal layer for modulating the light in accordance with the image signal encapsulated between a pair of transparent substrates. The R light modulated by the R-light spatial light modulation device 39R enters a cross dichroic prism 40 as a color combining optical system.

The G light and the B light transmitted through the first dichroic mirror 36 enter a second dichroic mirror 41. The second dichroic mirror 41 reflects the G light and transmits the B light. The G light input to the second dichroic mirror 41 is reflected by the second dichroic mirror 41 to thereby be folded in the light path, and then input to a G-light field lens 38G. The G-light field lens 38G collimates the G light from the second dichroic mirror 41, and then input it to a G-light spatial light modulation device 39G. The G-light spatial light modulation device 39G is a spatial light modulation device for modulating the G light in accordance with the image signal, and is a transmissive liquid crystal display device. The G light modulated by the G-light spatial light modulation device 39G enters the surface of the cross-dichroic prism 40 different from the surface thereof the R light enters.

The B light transmitted through the second dichroic mirror 41 is transmitted through a relay lens 42, and then reflected by a reflecting mirror 43 to thereby be folded in the light path. The B light from the reflecting mirror 43 is further transmitted through a relay lens 44, and then reflected by a reflecting mirror 45 to thereby be folded in the light path, and then input to a B-light field lens 38B. Since the light path of the B light is longer than either of the light path of the R light and the light path of the G light, in order for making the magnification of the illumination in the spatial light modulation device equal to those of the other colored light, the relay optical system using the relay lenses 42, 44 is adopted in the light path of the B light.

The B-light field lens 38B collimates the B light from the reflecting mirror 45, and then input it into a B-light spatial light modulation device 39B. The B-light spatial light modulation device 39B is a spatial light modulation device for modulating the B light in accordance with the image signal, and is a transmissive liquid crystal display device. The B light modulated by the B-light spatial light modulation device 39B enters the surface of the cross-dichroic prism 40 different from the surface thereof the R light and the G light enter.

The cross dichroic prism 40 is provided with two dichroic films 46, 47 substantially perpendicular to each other. The first dichroic film 46 reflects the R light and transmits the G light and the B light. The second dichroic film 47 reflects the B light and transmits the R light and the G light. The cross dichroic prism 40 combines the R light, the G light, and the B light having entered in respective directions different from each other to emit the combined light in the direction towards a projection lens 48. The projection lens 48 projects the light combined by the cross dichroic prism 40 towards the screen.

By using the light source device 2 achieving both of the improvement in the cooling efficiency of the light emitting tube and the prevention of the degradation of the efficiency of the light, it becomes possible for the projector 1 to display bright images stably and with efficiency. It should be noted that although in the present embodiment the light source device 2 is used in the manner in which the secondary reflecting mirror covers the lower side of the light emitting tube, by turning the projector 1 upside down and using it in an inverted state, the configuration of covering the upper side of the light emitting tube with the secondary reflecting mirror as described in the first embodiment can be realized. Therefore, although the upper side of the light emitting tube is covered and becomes apt to be in a high-temperature state when the projector 1 is used in the inverted state, by using the light source device 2 achieving the improvement in the cooling efficiency, it becomes possible to prevent the failure due to the defective cooling from occurring, thereby stably operating the projector 1.

The projector 1 is not limited to the case of using the transmissive liquid crystal display devices as the spatial light modulation devices. As the spatial light modulation device, a reflective liquid crystal display device (liquid crystal on silicon; LCOS), a digital micromirror device (DMD), a grating light valve (GLV), and so on can also be used. The projector 1 is not limited to having a configuration provided with the spatial light modulation device for every colored light beam. The projector 1 can be arranged to have a configuration of modulating two or more colored light beams by a single spatial light modulation device. The projector 1 is not limited to the case of using the spatial light modulation devices. The projector 1 can be a slide projector using a slide with image information.

As described above, the light source devices according to the embodiments of the invention are suitable for applying to projectors.

The entire disclosure of Japanese Patent Application No. 2009-97716, filed Apr. 14, 2009 is expressly incorporated by reference herein.

What is claimed is:

1. A light source device comprising:
    a light emitting tube having
        a light emitting section adapted to emit light,
        a first sealing section disposed on one side of the light emitting section integrally with the light emitting section, and
        a second sealing section disposed on the other side of the light emitting section integrally with the light emitting section;
    a secondary reflecting mirror having a secondary reflecting surface covering a part of a periphery of the light emitting section, and adapted to reflect light emitted from the light emitting section; and
    a primary reflecting mirror having a primary reflecting surface adapted to reflect the light emitted from the light emitting section and the light reflected by the secondary reflecting mirror,
    wherein the secondary reflecting mirror has a shape with which a first reference plane determined based on a first boundary line as a boundary between the light emitting section and the first sealing section and the secondary reflecting surface fail to intersect with each other.

2. The light source device according to claim 1, wherein the first reference plane is a circular conical plane including a center point of the light emitting section and the first boundary line.

3. The light source device according to claim 1, wherein the secondary reflecting mirror has a shape with which a second reference plane determined based on a second boundary line as a boundary between the light emitting section and the second sealing section and the secondary reflecting surface fail to intersect with each other.

4. The light source device according to claim 3, wherein the second reference plane is a circular conical plane including the center point of the light emitting section and the second boundary line.

5. The light source device according to claim 1, further comprising:
    an extending section disposed integrally with the secondary reflecting mirror adapted to cover a part of the second sealing section,
    wherein an opening is provided to at least one of the other side of the secondary reflecting mirror and the extending section.

6. The light source device according to claim 1, wherein an angle formed between a line connecting an edge of the secondary reflecting surface on at least one of a side on which the first sealing section is disposed and a side on which the second sealing section is disposed, and a center point of the light emitting section, and a center axis of the light emitting tube is smaller than 45°.

7. A projector comprising:
    the light source device according to claim 1; and
    a spatial light modulation device adapted to modulate the light emitted from the light source device in accordance with an image signal.

* * * * *